(12) United States Patent
Moeller

(10) Patent No.: US 11,198,597 B2
(45) Date of Patent: Dec. 14, 2021

(54) SENSING ARRANGEMENT FOR STABILIZING AN OFFSHORE WIND TURBINE INSTALLATION ARRANGEMENT

(71) Applicant: Siemens Gamesa Renewable Energy A/S, Brande (DK)

(72) Inventor: Jesper Moeller, Brande (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/618,942

(22) PCT Filed: May 28, 2018

(86) PCT No.: PCT/EP2018/063939
§ 371 (c)(1),
(2) Date: Dec. 3, 2019

(87) PCT Pub. No.: WO2018/228809
PCT Pub. Date: Dec. 20, 2018

(65) Prior Publication Data
US 2020/0141388 A1    May 7, 2020

(30) Foreign Application Priority Data
Jun. 12, 2017   (DE) ...................... 10 2017 209 876.7

(51) Int. Cl.
*B66C 13/46*      (2006.01)
*B66C 13/08*      (2006.01)
(Continued)

(52) U.S. Cl.
CPC ............ *B66C 13/46* (2013.01); *B66C 13/085* (2013.01); *B66C 23/52* (2013.01); *F03D 13/25* (2016.05); *F03D 13/10* (2016.05)

(58) Field of Classification Search
CPC ......... B63B 27/00; B63B 27/10; B63B 27/30; B63B 27/36; B63B 27/12; B63B 27/16;
(Continued)

(56) References Cited

U.S. PATENT DOCUMENTS 4,121,806 A * 10/1978 Lato ........................ E21B 19/09
166/355
4,324,385 A *  4/1982 Cojean .................... B63B 27/16
254/270
(Continued)

FOREIGN PATENT DOCUMENTS

| CN | 201261694 Y | 6/2009 |
| CN | 102616339 A | 8/2012 |

(Continued)

OTHER PUBLICATIONS

A-type—Ampelmann—Motion Compensated Gangway; https://www.ampelmann.nl/systems/a-type; retrieved on Dec. 10, 2019.
(Continued)

*Primary Examiner* — Gregory W Adams
(74) *Attorney, Agent, or Firm* — Schmeiser, Olsen & Watts LLP

(57) ABSTRACT

Provided is an offshore wind turbine installation arrangement, including a lifting assembly realized to hoist a suspended load between a floating installation vessel and a wind turbine assembly, the lifting assembly including a crane supported by the floating installation vessel; a sensor arrangement realized to sense at least a motion of the floating installation vessel; and a controller realized to control elements of the lifting assembly on the basis of the sensed installation vessel motion to adjust the position of the suspended load relative to the wind turbine assembly. Also provided is a method of hoisting a load between a floating installation vessel and an offshore wind turbine assembly.

14 Claims, 4 Drawing Sheets

(51) Int. Cl.
*F03D 13/25* (2016.01)
*B66C 23/52* (2006.01)
*F03D 13/10* (2016.01)

(58) Field of Classification Search
CPC ....... B63B 35/003; B63B 27/18; B66C 23/52; Y10S 254/90; B66D 1/52; B66D 1/48; B65H 23/198
See application file for complete search history.

(56) References Cited

U.S. PATENT DOCUMENTS

| | | | | | |
|---|---|---|---|---|---|
| 4,713,798 | A | * | 12/1987 | Kay | B07C 5/10 367/100 |
| 4,883,184 | A | * | 11/1989 | Albus | B66C 13/06 212/274 |
| 5,089,972 | A | * | 2/1992 | Nachman | B66C 13/46 414/139.7 |
| 6,232,735 | B1 | * | 5/2001 | Baba | B25J 9/1689 318/567 |
| 6,505,574 | B1 | * | 1/2003 | Naud | B63B 27/10 114/268 |
| 6,826,452 | B1 | * | 11/2004 | Holland | B66C 1/663 318/566 |
| 7,367,464 | B1 | * | 5/2008 | Agostini | B66C 13/063 212/308 |
| 8,195,368 | B1 | * | 6/2012 | Leban | B66C 13/063 701/50 |
| 9,009,964 | B2 | * | 4/2015 | Lynderup | F03D 13/20 29/889 |
| 9,266,700 | B2 | * | 2/2016 | Schneider | B66C 13/085 |
| 9,303,473 | B2 | * | 4/2016 | Austefjord | B66C 13/02 |
| 9,950,910 | B2 | * | 4/2018 | Sorensen | B66D 1/505 |
| 2005/0103738 | A1 | * | 5/2005 | Recktenwald | B66C 13/063 212/275 |
| 2009/0232625 | A1 | * | 9/2009 | Almeda, Jr. | B66C 13/02 414/139.6 |
| 2010/0230370 | A1 | | 9/2010 | Schneider et al. | |
| 2012/0266796 | A1 | | 10/2012 | Roodenburg et al. | |
| 2012/0296519 | A1 | * | 11/2012 | Eberharter | B63B 27/10 701/34.4 |
| 2013/0051924 | A1 | | 2/2013 | Willis et al. | |
| 2014/0064856 | A1 | | 3/2014 | Westergaard | |
| 2015/0360887 | A1 | * | 12/2015 | Maij | B63B 27/10 414/803 |
| 2016/0063709 | A1 | | 3/2016 | Booij et al. | |
| 2016/0167932 | A1 | * | 6/2016 | Holmberg | B66C 13/46 382/104 |
| 2017/0096196 | A1 | * | 4/2017 | Foo | B63B 27/30 |

FOREIGN PATENT DOCUMENTS

| | | |
|---|---|---|
| CN | 103670946 A | 3/2014 |
| KR | 20160097529 A | 8/2016 |

OTHER PUBLICATIONS

PCT International Search Report dated Sep. 10, 2018 corresponding to PCT International Application No. PCT/EP2018/063939.
Written Opinion dated Sep. 10, 2018 corresponding to PCT International Application No. PCT/EP2018/063939.
PCT International Search Report and Written Opinion dated Sep. 10, 2018 corresponding to PCT International Application No. PCT/EP2018/063939.
Office Action in corresponding Chinese Patent Application No. 201880039213.1 dated Sep. 10, 2020. 8 pages.

* cited by examiner

SENSING ARRANGEMENT FOR STABILIZING AN OFFSHORE WIND TURBINE INSTALLATION ARRANGEMENT

CROSS-REFERENCE TO RELATED APPLICATIONS

This application claims priority to PCT Application No. PCT/EP2018/063939, having a filing date of May 28, 2018, which is based on German Application No. 10 2017 209 876.7, having a filing date of Jun. 12, 2017, the entire contents both of which are hereby incorporated by reference.

FIELD OF TECHNOLOGY

The following describes an offshore wind turbine installation arrangement; and a method of hoisting a load between a floating installation vessel and an offshore wind turbine assembly.

BACKGROUND

To construct an offshore installation such as a wind turbine, it is usual to transport the relevant components to the installation site using a jackup vessel, and to use the jackup vessel as a relatively stable base from which to operate a crane to hoist the heavy components into place. For example, a jackup vessel can transport tower sections, nacelle, generator, rotor blades etc. to the installation site. In a series of lifting manoeuvres, the components are hoisted into place and connected. The procedure can be complicated by several factors. However, not only are some of the components unwieldy and also vulnerable to damage (for example a rotor blade), the connection of one component to the already partially installed wind turbine can be made difficult by high winds, by any inherent instability of the jackup vessel, and by motion of the already partially installed wind turbine. It can be very difficult to align the suspended load to its target for example to align the root end of a suspended rotor blade to a pitch ring on the spinner or hub—when the load is buffeted by the wind, and the target is also oscillating due to wind or water current loading.

These problems are exacerbated even further when the installation site is in relatively deep water. To date, many offshore wind parks are located relatively close to shore, and a water depth in the region of 30 m has been the norm. The relatively good soil conditions at these water depths allow the legs of the jackup vessel to penetrate the seabed to a sufficient depth, so that the jackup vessel is "anchored" for the duration of the installation procedure. However, when the installation site is further offshore and in deeper waters (60 m or more), the soil conditions may be such that the legs of the jackup vessel cannot penetrate to a sufficient depth. If the legs of the jackup vessel are not designed for such water depths, over-extending them to reach and penetrate the seabed may result in an unstable setup. Furthermore, the tower of a wind turbine in such a remote offshore wind park may reach a height of over 100 m, maybe even exceeding 140 m. This poses a further problem, since any crane used to lift components into place must be able to extend beyond this height, adding to the overall instability of the system.

The combination of deep water, poor soil conditions, and unstable jackup vessel can significantly prolong the installation procedure, thereby adding to the overall cost of construction of a wind park. Of course, such costs are not limited to an installation procedure. Any maintenance step that involves replacement of a rotor blade or generator will also require the use of such a jackup vessel and crane and will suffer from the same problems.

SUMMARY

An aspect relates to an improved way of hoisting a heavy wind turbine component at an offshore wind turbine location.

According to embodiments of the invention, the offshore wind turbine installation arrangement comprises a lifting assembly realized to hoist a suspended load between a floating installation vessel and a wind turbine assembly, which lifting assembly comprises a crane supported by the floating installation vessel; a sensor arrangement realized to sense at least a motion of the floating installation vessel; and a controller realized to control elements of the lifting assembly on the basis of the sensed installation vessel motion to adjust the position of the suspended load relative to the wind turbine assembly.

The floating installation vessel is to be understood as an installation vessel that simply floats on the water, i.e. it does not use any jackup legs or columns to stabilise the vessel deck. In addition to rotation about one, two or three axes, a floating vessel may also be subject to translation in one, two or three directions. The erratic motion of the floating vessel in any combination of these six degrees of freedom makes it essentially impossible to predict the behaviour of a suspended load. For this reason, floating installation vessels have only been used in relatively shallow water (30-40 m) during the assembly of offshore installations, for example to lift a jacket structure into place, or to lift an already assembled (relatively small) wind turbine into place on a previously placed supporting structure. However, floating installation vessels have not been used in deep water for the assembly of offshore wind turbines owing to the difficulties arising from the many degrees of freedom of such a floating vessel.

In the context of embodiments of the invention, the load may be understood to be any wind turbine component such as a tower, a tower section, a nacelle, a generator, a hub, a rotor blade, etc. The lifting assembly can hoist such a heavy and cumbersome wind turbine component from the floating installation vessel to the wind turbine assembly during a wind turbine installation procedure or during a maintenance procedure. The lifting assembly can comprise any suitable crane, for example a crane with a boom, jib, and a traverse/guidewire/tagline arrangement. The elements of the inventive installation arrangement that can be controlled by the controller can be any one or more of a winch, a hydraulic cylinder, etc.

Particularly when a hoisted component is to be mounted to the already partially assembled wind turbine, the inventive installation arrangement allows an advantageously precise and controlled guiding of the heavy load towards its target, for example the root end of a rotor blade can be guided very precisely to the corresponding pitch ring of the hub, even if the floating installation vessel is exhibiting significant movement in one or more directions and transferring these movements to the suspended load.

Equally, the inventive installation arrangement can be used when such a wind turbine component is to be detached from a wind turbine assembly and lowered to a floating installation vessel, and can greatly simplify the procedure by controlling elements of the lifting assembly on the basis of the sensed installation vessel motion.

According to embodiments of the invention, the method of hoisting a load between a floating installation vessel and an offshore wind turbine assembly comprises the steps of providing a lifting assembly—a crane supported by a floating installation vessel—to hoist the load; sensing a relative motion of the floating installation vessel during the lifting manoeuvre; and controlling elements of the lifting assembly at least on the basis of a sensed motion to adjust the position of the suspended load relative to the wind turbine assembly.

An advantage of the inventive method is that the duration of a component lifting manoeuvre can be significantly reduced, since the inventive method is not sensitive to poor weather conditions and/or high seas. Any motion of the floating installation vessel caused by stormy conditions or rough seas can be detected by the sensor arrangement and taken into account by the controller, so that the position of the suspended load relative to the wind turbine assembly can be adjusted as required. The inventive method is not only faster than the known procedures, it is also significantly safer, since the load can always be moved in a controlled manner even in unfavourable conditions.

According to embodiments of the invention, a computer program product (non-transitory computer readable storage medium having instructions, which when executed by a processor, perform actions comprises a computer program that is directly loadable into a memory of a controller of the inventive installation arrangement and which comprises program elements for performing steps of the inventive method when the computer program is executed by the controller of the installation arrangement.

The controller of the inventive installation arrangement is therefore able to respond essentially immediately to any motion of the floating installation vessel, and to adjust the position of the suspended load accordingly. In this way, the load can advantageously always be moved in a very precisely controlled manner relative to the wind turbine assembly.

Particularly advantageous embodiments and features of the invention are given by the dependent claims, as revealed in the following description. Features of different claim categories may be combined as appropriate to give further embodiments not described herein.

While the inventive installation arrangement is described herein in the context of an offshore wind turbine installation, it will be understood that the inventive concept can be used during the installation or maintenance of any offshore installation that is performed from a floating installation vessel.

In the following, without restricting embodiments of the invention in any way, it may be assumed that the installation arrangement is adapted for the installation of a wind turbine with a tower height of at least 100 m, at least 120 m. In the following, it may also be assumed that the hoisting manoeuvre is being performed at an installation site for which the water depth exceeds 40 m. As mentioned above, it may no longer be practicable to use a jackup vessel in such water depths.

Like any vessel floating on the water, at any one time the floating installation vessel may exhibit roll, pitch, yaw and heave motions caused by water swell, wave action, wind, etc. While the floating vessel can be equipped with a suitable propulsion arrangement to compensate for any translatory surge (fore and back) and sway (sideways) motions, there is no practicable way of preventing the translatory heave motion (up and down) that arises because of ocean swell or deep water waves. Depending on the size of the swell, the floating installation vessel may be raised and lowered by several metres within a relatively short space of time. It is also not practicable to suppress the rotatory motion of the floating installation vessel about its three axes, but rotation about any one of these axes will result in an oscillation of the suspended load. As indicated above, the crane of the lifting assembly is supported by the floating installation vessel, and comprises a boom that can extend beyond the height of the assembled wind turbine. In the context of embodiments of the invention, it may be assumed that the load is suspended from the tip region (or uppermost region) of the boom from a suitable hook arrangement. A sideways rolling motion of the floating installation vessel is transferred to the crane, and would result in a sideways swinging motion of a freely-suspended load. Similarly, a pitching movement of the floating installation vessel will be transferred to the crane and will result in a swinging motion of the load. A heave motion of the floating installation vessel is transferred to the crane, and would result in an up-and-down motion of a freely-suspended load. In a preferred embodiment of the invention, therefore, the sensor arrangement comprises a first sensor set realized to detect a roll motion (about a horizontal X axis), a pitch motion (about a horizontal Y axis), and a heave motion (along a vertical Z axis) of the floating installation vessel. One or more sensors (or a group of sensors) may be used to detect each of these different types of movement, so that each motion can be counteracted independently of the other two types of motion.

When a wind turbine component such as a rotor blade or hub is being lifted into position to connect it to the already installed wind turbine assembly, the procedure is made more difficult by the swaying or oscillating motion of the tower and nacelle. This swaying or oscillating motion can be caused by wind. Particularly in the case of a wind turbine tower installed on a monopile foundation, an oscillating motion of the tower can arise from the push/pull action of the seawater on the monopile. Therefore, in a further preferred embodiment of the invention, the sensor arrangement comprises a second sensor set realized to sense a lateral displacement of the wind turbine assembly. Such a second sensor set can be arranged at a suitable position on the wind turbine assembly, for example at the base of the tower, at the top of the tower, at the nacelle, etc.

The load being lifted into place may be suspended from a hook on a cable or rope. The hook can be lowered or raised by adjusting the length of the cable or rope using an appropriate winch motor, for example a winch motor arranged on the crane's jib portion. The suspended load may oscillate, and the amplitude and direction of oscillation will depend to some extent on the wind conditions. To stabilise the load, one or more taglines are generally connected between the boom and the load so that any unwanted swinging motion of the load can be suppressed.

In a preferred embodiment of the invention, the lifting assembly comprises a lifting tool to hold a wind turbine component during a lifting manoeuvre. In an exemplary embodiment, a lifting tool comprises an adjustable yoke for holding a wind turbine blade in a horizontal position during a lifting manoeuvre, and also an adjustable hook/yoke interface for suspending the yoke from a hook of the lifting assembly. In this exemplary embodiment, the adjustable hook/yoke interface can be realised to raise and lower the yoke as appropriate. In a particularly preferred embodiment of the invention, the controller is realized to control an actuator of the adjustable hook/yoke interface at least on the basis of a sensed heave motion of the installation vessel. In a preferred embodiment of the invention, the adjustable hook/yoke interface comprises a number of hydraulic actuators to achieve the desired adjustment. For example, the hook/yoke interface can comprise one or more vertically arranged hydraulic cylinders to effect a vertical displacement of the load to at least partially counteract a heave motion of the floating installation vessel.

The crane, as described above, may comprise a tagline arrangement to stabilize the load during a lifting manoeuvre. A crane that uses one or more traverse structures may also comprise a guidewire arrangement to carry a pair of snatch blocks for the taglines. A tagline can be anchored between a bottom traverse and a top traverse, for example, and can pass through a snatch block that acts to divert the tagline to the load. Taglines are generally used to stabilize a load during a lifting manoeuvre, particularly when the crane has a relatively long outreach, and to ensure that the load will not oscillate excessively. Therefore, in a preferred embodiment of the invention, the controller is realized to control a guidewire winch and/or a tagline winch on the basis of a sensed roll motion and/or a sensed pitch motion of the installation vessel.

As indicated above, a load such as a rotor blade can be affected by the wind during the lifting manoeuvre. Uplift experienced by a very long rotor blade—for example with a length of 80 m or more—can make it difficult to precisely manoeuvre the horizontal blade into place for connecting to a pitch ring on the hub. Therefore, in a preferred embodiment of the invention, the lifting tool can comprise two or more actuators to effect an angular displacement of the load to counteract any uplift experienced by the suspended load during the lifting manoeuvre. For example, such actuators can be part of a lifting yoke, and can be realised as a number of hydraulic cylinders. In this way, the yoke of a lifting tool can be controlled to alter the angle of the suspended load about one or two horizontal axes.

Another factor that can affect the relative motion of load and target is the oscillation of the wind turbine tower caused by deep water waves. Particularly in the case of a monopile foundation, the monopile (and tower) will oscillate with a frequency and amplitude that is governed by the severity of the deep water wave action. In a preferred embodiment of the invention, the sensor arrangement is realised to detect such an oscillatory motion of the supporting structure or tower, and the controller is realised to control actuators of the lifting assembly accordingly.

There are various ways in which the sensor arrangement and the controller can achieve the desired smooth motion of the load relative to the target. In a preferred embodiment of the invention, the sensor arrangement can be realised as a motion capture arrangement, with a number of markers arranged on the floating installation vessel, and at least one camera arranged at a low level of the wind turbine installation to detect any movement of the markers. The camera can be installed at an upper level of the supporting structure, for example, so that it can be used during the entire installation procedure. Alternatively, such a camera may be arranged at a lower region of the wind turbine tower. The markers are arranged on the floating installation vessel to be in visual range of a camera. A marker can be passive, for example a brightly painted square on the installation vessel. Equally, a marker may be active, for example an LED lamp that emits light which can be detected by a camera. While a small number of markers and a single camera might be sufficient to detect roll, pitch and heave motion of the floating installation vessel, in a preferred embodiment of the invention, each of these type of motion is tracked by several markers, for example by a specific set of markers. For example, a first set of markers can be arranged on the floating installation vessel to assist in detecting a roll motion; a second set of markers can be arranged on the floating installation vessel to assist in detecting a pitch motion; and a third set of markers can be arranged on the floating installation vessel to assist in detecting a heave motion. Different sets of markers can be distinguished by colour, shape etc. Of course, it is possible to use more than one camera to track the motion of these markers. The controller is realised to analyse image data provided by the cameras to detect the displacement of each marker or marker set, and to deduce the relevant roll/pitch/heave motion of the floating installation vessel. For example, after observing the markers for a few minutes, the controller may be able to identify an essentially periodic rolling motion about an axis of the floating installation vessel; and to identify an essentially periodic heave motion along the vertical Z axis of the floating installation vessel.

Alternatively or in addition, the sensor arrangement can comprise a number of accelerometers to detect motion of the floating installation vessel relative to the target. For example, separate sets of accelerometers can be arranged at suitable locations on the floating installation vessel to detect a roll motion and/or a pitch motion and/or a heave motion of the floating installation vessel. Of course, any kind of sensor arrangement can be deployed, provided it is capable of reliably detecting motion in a specific direction to a sufficient degree of accuracy.

With information regarding the amplitudes and frequencies of the various kinds of motion, the controller computes the necessary displacement of the load to counteract these motions, and generates appropriate control signals for any suitable actuators to achieve the desired correction of the position of the suspended load relative to the target. For example, to respond to a heave motion of the floating installation vessel, the controller can generate control signals for the actuator of a vertical hydraulic cylinder arrangement of a hook/yoke interface to raise and lower the load in a direction opposite to the direction of motion of the floating installation vessel and at the same rate. As a result, the suspended load will appear to remain stationary in space even though the floating installation vessel is being raised and lowered along the heave direction.

Similarly, any rolling and pitching motions of the floating installation vessel can be detected and quantified, and this information can be used by the controller to compute a required tagline pay-out and/or tagline tension to suppress the load oscillation that would otherwise result from a rolling motions of the floating installation vessel; similarly the controller can use information from the sensor arrangement to determine a yawing motion of the floating installation vessel and to compute a required crane boom displacement to counteract the yawing motion.

BRIEF DESCRIPTION

Some of the embodiments will be described in detail, with references to the following Figures, wherein like designations denote like members, wherein.

DETAILED DESCRIPTION

Figure 1:
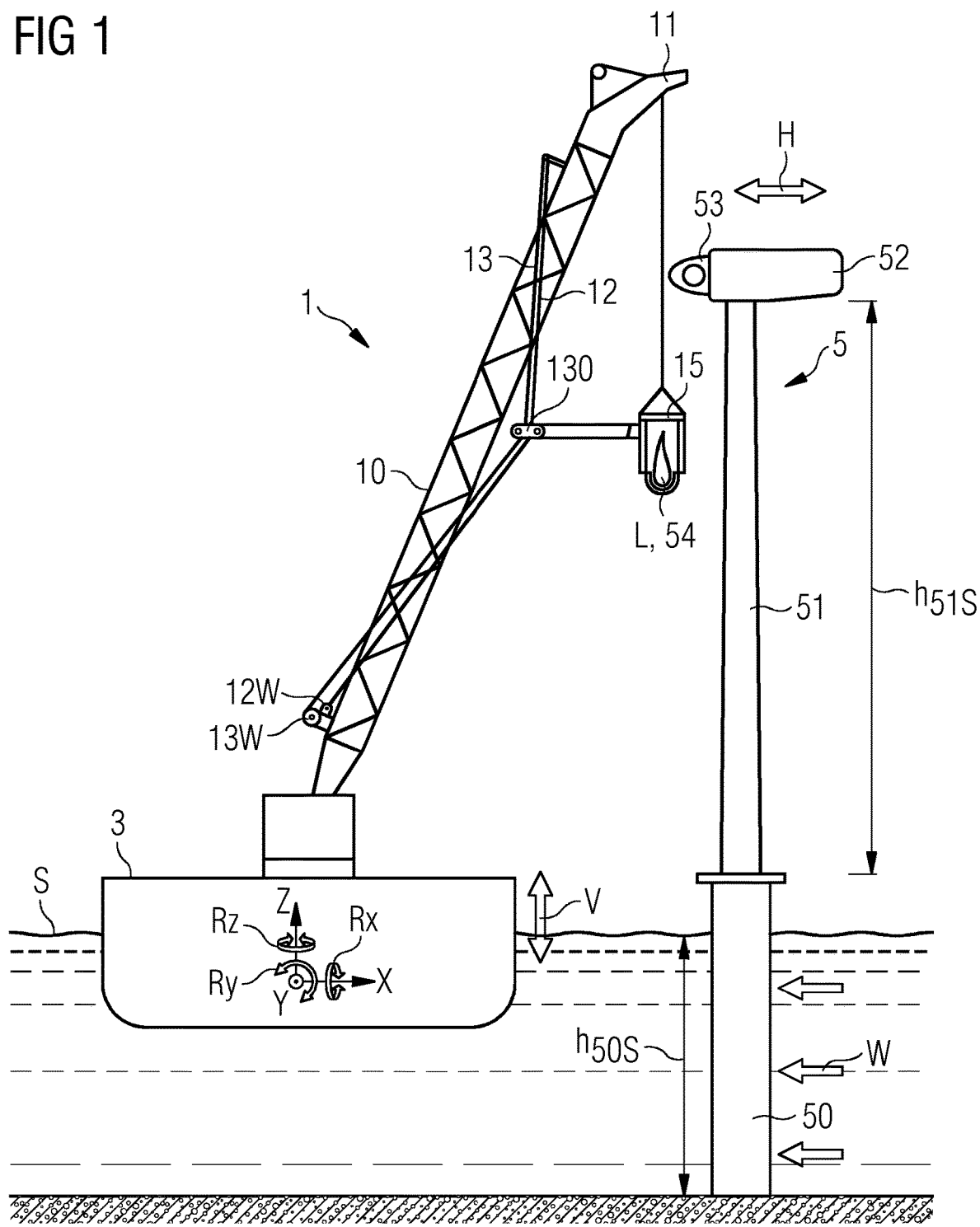
FIG. 1 shows a conventional installation arrangement during the installation of an offshore wind turbine.

FIG. 1 shows elements of a know art installation arrangement 1, 3 during the installation of an offshore wind turbine 5. The diagram shows a floating installation vessel 3 beside the installation site. An offshore wind turbine 5 is being assembled on top of a supporting structure 50. The tower 51, nacelle 52 and hub 53 have already been assembled, and a load L in this case a rotor blade 54—is being hoisted towards a target. Here, the target is the hub 53, and the rotor blade 54 is to be connected to a blade pitch ring. Unlike a jackup vessel, which can be "anchored" to the ground by extending its legs to penetrate into the seabed to a sufficient depth, a floating installation vessel 3 cannot be prevented from moving. With respect to a three-dimensional coordinate system indicated in the diagram, the floating installation vessel 3 can exhibit rotatory motion about any of three axes X, Y, Z and can also exhibit translatory motion along any of the three axes X, Y, Z. While translatory motion along the two horizontal axes X, Y can be counteracted by a suitable propulsion arrangement, it is not possible to prevent the heave motion V of the floating installation vessel 3 along the vertical axis Z. It is also not possible to prevent the rotatory motion RX, RY, RZ about the three axes X, Y, Z. As a result, when the load L is being hoisted into place, the various motions RX, RY, RZ, V of the floating installation vessel 3 cause the load L to be displaced relative to the target. The problem is exacerbated by motion of the target. For example, wave action W on the supporting structure 50 and/or wind loading on the tower 51 and nacelle 52 can result a periodic lateral displacement H of the wind turbine 5, making it more difficult to align a load L with its target. For these reasons, it is generally not possible to use a floating installation vessel 3 for the installation of wind turbines 5 in deep water or in poor weather conditions. The skilled person will know that a favourable combination of such conditions can be rare.

However, offshore wind parks are being installed in deep water, for example in water depths that can exceed 40 m, for example depths of 50-60 m. As explained above, a jackup vessel cannot practicably be used for the assembly of a wind turbine in such water depths, but the many degrees of freedom in the movements of a floating installation vessel 3 lead to stability problems. Furthermore, the crane used to assemble a wind turbine must be able to extend beyond the total height of the wind turbine. Since wind turbines for such offshore wind parks will have tower heights that exceed 100 m, for example tower heights of 140 m, the added instability caused by a very tall crane hoisting a heavy load to a great height makes the combination of floating installation vessel and crane impracticable.

Figure 2:
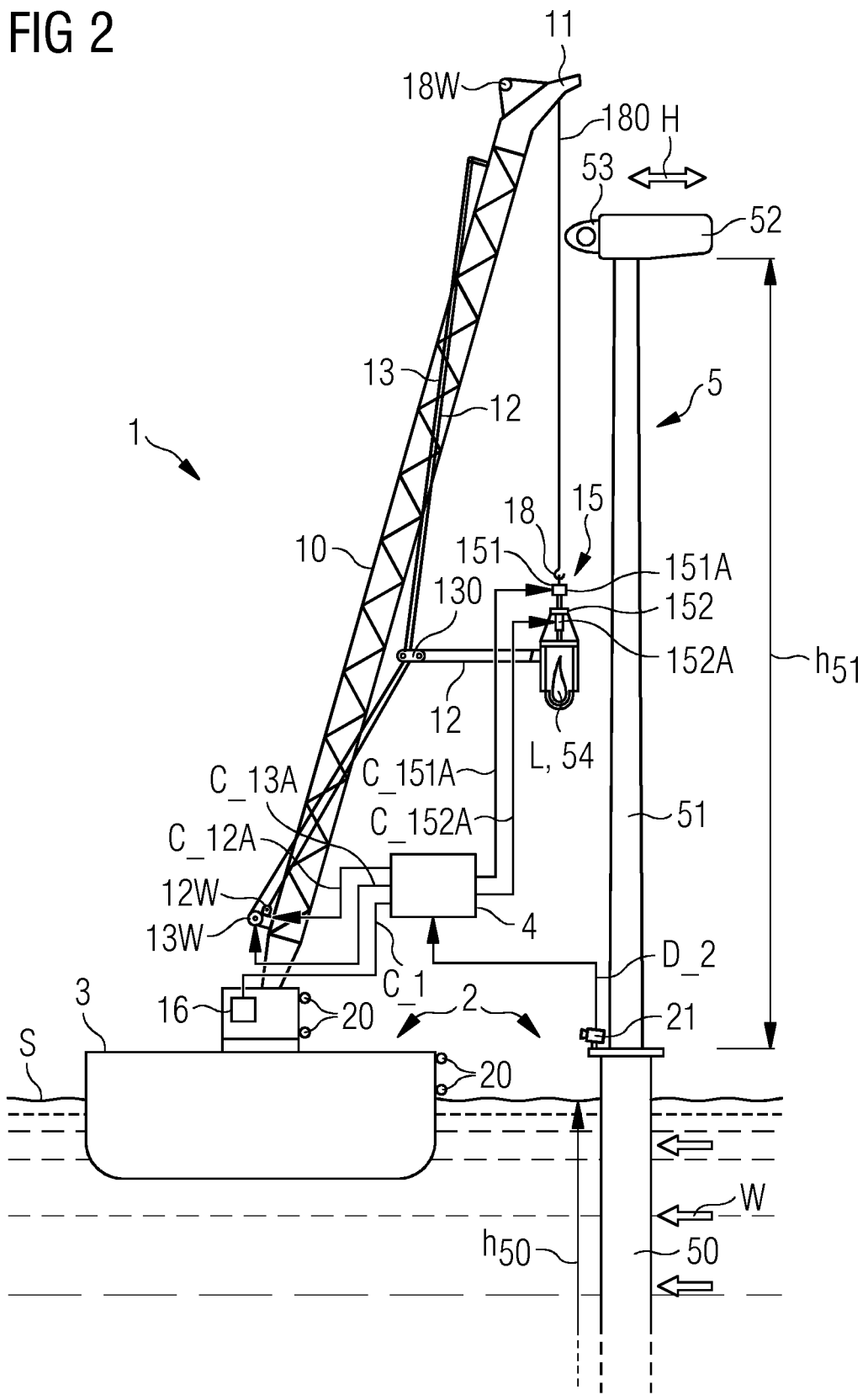
FIG. 2 shows an embodiment of an installation arrangement during the installation of an offshore wind turbine.

The inventive installation arrangement 1, 2, 3, 4 can overcome these problems. FIG. 2 shows elements of the inventive installation arrangement 1, 2, 3, 4 during the installation of an offshore wind turbine 5 in a water depth exceeding 50 m. As already described with the aid of FIG. 1, a floating installation vessel 3 has been used to transport wind turbine components 51, 52, 53, 54 to an installation site and is being used to assemble the wind turbine 5. In this case, the crane 10 comprises a boom and jib with sufficient length to extend beyond the height of an assembled wind turbine 5 with a tower height in the region of 140 m. A sensor arrangement 2 has been provided, in this case the sensor arrangement 2 comprises a motion tracking assembly with one or more cameras 21 and various markers 20 attached at appropriate points on the floating installation vessel 3 within sight of the camera(s) 21. A camera 21 is stationary relative to the markers 20, and any movement of the markers will be recorded by the camera 21. A control unit 4 is provided which can continually receive image data from the camera(s) 21 and which can analyse the image data to determine the rotation RX, RY, RZ and also the vertical heave V of the floating installation vessel 3. The control unit 4 is also informed of the crane position, load weight, load height etc. With this information, the control unit 4 then computes a correction required to counteract a motion RX, RY, RZ, V of the floating installation vessel 3, and generates appropriate control signals C_12A, C_13A, C_151A, C_152A, C_10 for any relevant actuator such as a winch motor 12A of a tagline 12, a winch motor 13A of a guidewire 13, a hydraulic actuator 151A, 152A of a lifting tool 15, a crane controller 16, a winch motor 18W of the hook cable 180, etc.

The control unit 4 is not only capable of determining rotatory and translatory motion of the floating installation vessel 3, it can also be realised to sense a lateral displacement H of the wind turbine assembly 5. Wave action W on the monopile 50 can result in the entire wind turbine assembly oscillating back and forth, as explained above. By analysing the data sensed by the sensor arrangement 2, the controller 4 can establish whether any such motion of the wind turbine tower 51 is significant enough to require corrective action, and can adjust the control signals C_12A, C_13A, C_151A, C_152A, C_10 accordingly.

Corrections can be made continually, at regular intervals, intermittently, etc. in order to hoist the load L into place at the target. For example, the load may be hoisted partway to the target without considering any corrective action. Instead, the corrective signals computed by the control unit may be applied shortly before the load is to "dock" with the target. The control unit 4 may be realised in a computer, a handheld device, etc.

Figure 3:
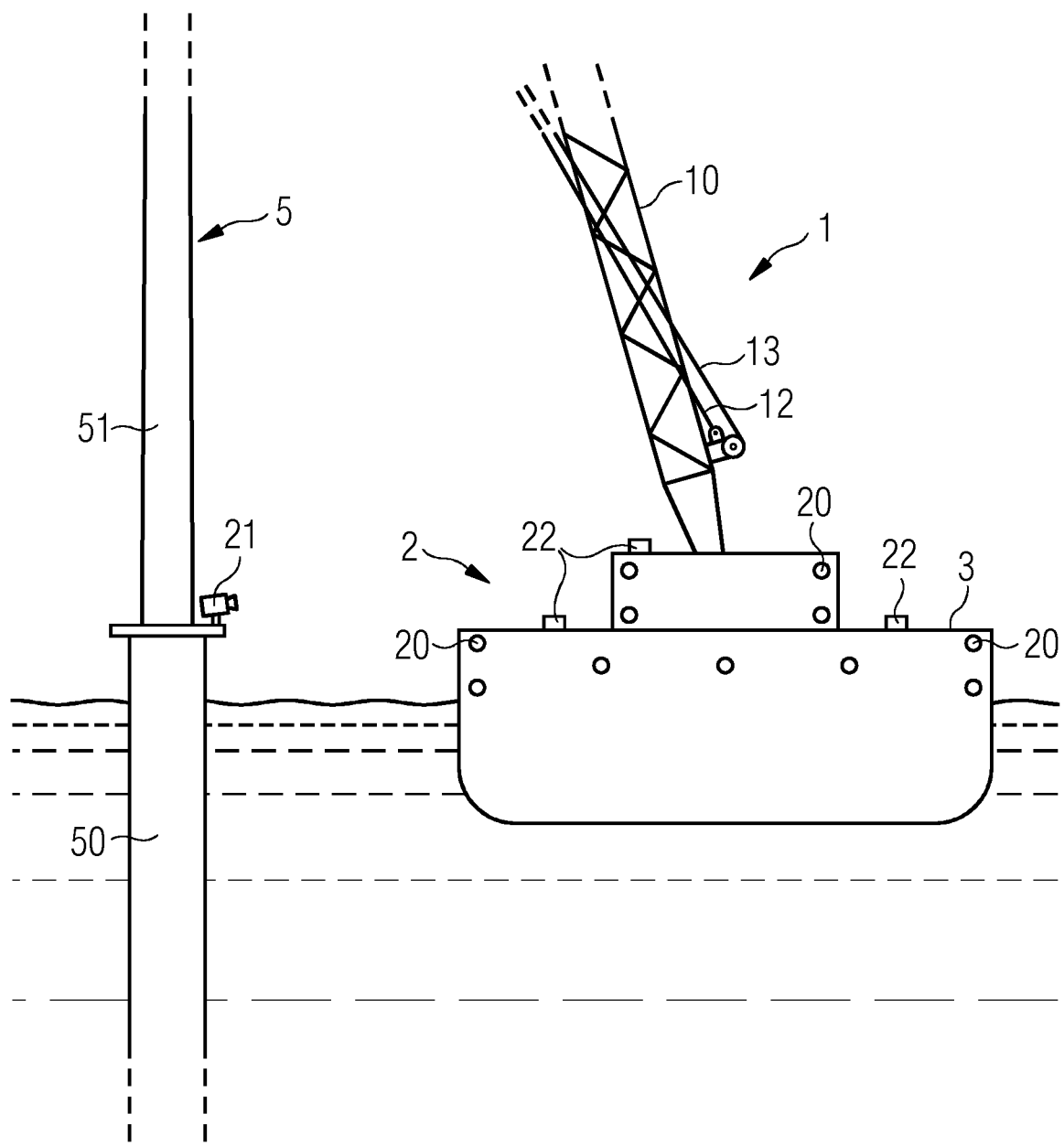
FIG. 3 shows a sensor arrangement of the installation arrangement.

FIG. 3 shows how a sensor arrangement 2 may be achieved. Here, one or more cameras 21 are installed at a transition piece of the wind turbine 5, and are positioned to "see" markers 20 arranged at various locations on the floating installation vessel 3. The markers can be passive, for example brightly coloured or high-visibility paint marks or objects at the side of the floating installation vessel 3 that faces the cameras 21. Markers 20 may be active, for example LED lights that emit a bright light. Such a realisation can be advantageous in foggy or dim conditions. Active markers can emit in infrared light, so that they can be detected even in dark conditions. To distinguish the markers from each other and to facilitate tracking of the markers, neighbouring markers can have different colours, can emit light at different wavelengths, can emit light at different frequencies, etc.

In addition to or instead of a camera and image analysis approach, the sensor arrangement 2 may use sensors 22 such as accelerometers 22 to detect and rotatory motions RX, RY, RZ or a translatory motion V of the floating installation vessel 3. For example, it would be possible to track these motions using at least three accelerometers 22 arranged at suitable positions on the floating installation vessel 3.

The controller 4 (not shown in this diagram) can collect data from cameras 21 and/or accelerometers 22, analyse the data, and determine any corrective action to be taken in order to align the load L with its target.

Figure 4:
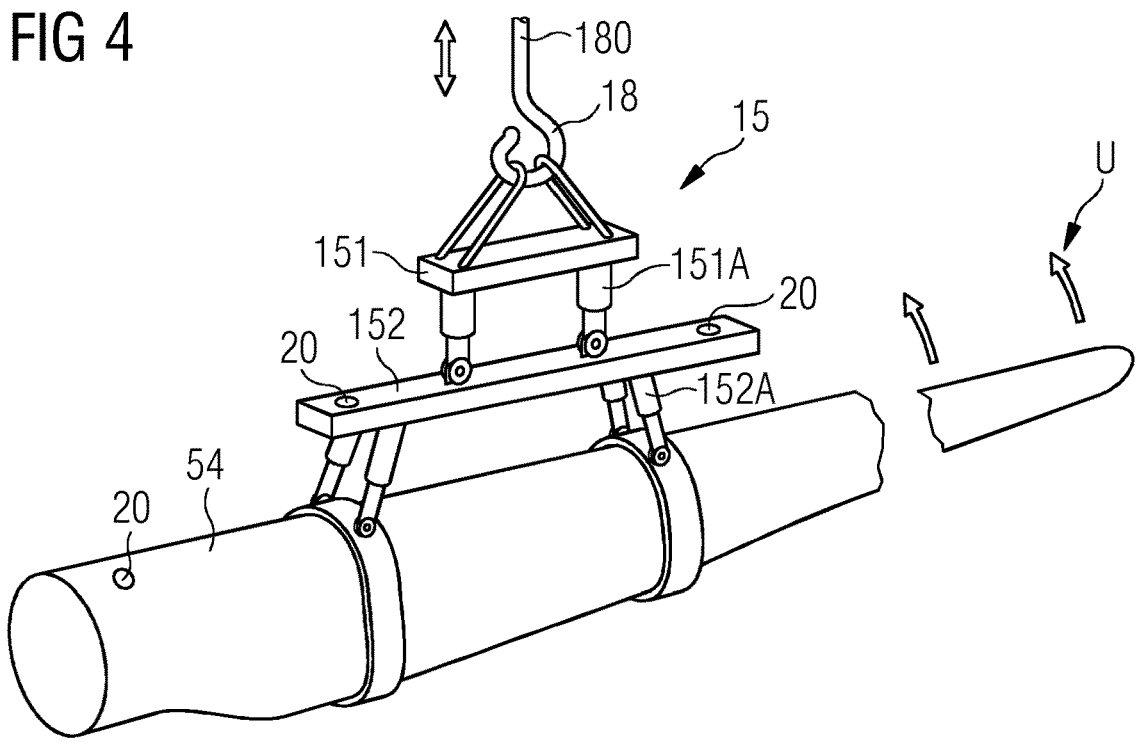
FIG. 4 shows a lifting tool of the installation arrangement.

FIG. 4 shows a simplified lifting tool 15, in this case a lifting tool 15 that is adapted to hold a rotor blade 54 while this is being raised to a blade pitch ring of a previously installed hub on a partially assembled wind turbine. The lifting tool 15 has a suspension interface 151 for suspending the lifting tool 15 from a crane hook 18, which suspension interface 151 comprises a number of vertically extendable actuators 151A, in this case a vertical arrangement of hydraulic cylinders. The lifting tool 15 also has a gripping assembly 152 for holding the rotor blade 54, with a number of laterally extendable actuators 152A, in this case a lateral arrangement of hydraulic cylinders. The controller 4 can issue control signals C_151A, C_152A to control the extension and retraction of the hydraulic cylinders 151A, 152A to at least partially counteract a sensed heave motion V of the floating installation vessel 3 (the heave motion V can also be partially counteracted by controlling a motor winch of the hook cable as explained above to adjust the length of cable 180 from which the hook 18 is suspended and/or by controlling the crane's boom and jib).

The drawing also shows a number of sensors 20 arranged to report a change in orientation of the rotor blade 54. For example, uplift U because of wind can cause the tip end of the blade 54 to push upward, thereby tilting the entire blade 54. The sensors 20 for example accelerometers—can report any change in position to the controller 4, which detects the extent of uplift, and generates control signals C_151, C_152 to react accordingly in order to keep the rotor blade 54 steady.

Figure 5:
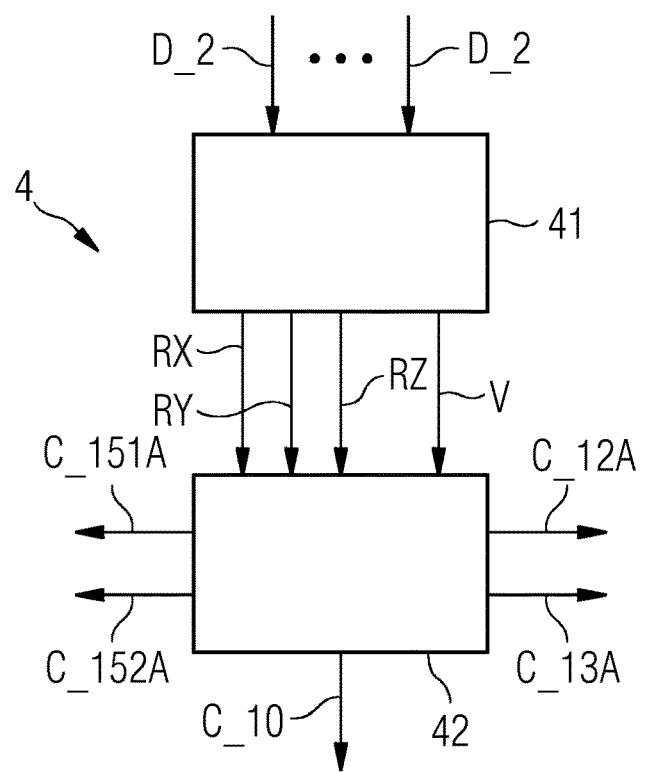
FIG. 5 shows a block diagram of a controller of the installation arrangement.

FIG. 5 shows a simplified block diagram of the controller 4. The controller 4 is setup to receive data D_2 from the sensors of the sensor arrangement 2, for example image data from one or more cameras, and/or data from one or more accelerometers, etc. With this information, an analysis unit 41 determines any rotatory motion RX, RY, RZ of the floating installation vessel 3 as well as any heave motion V. For example, the analysis unit 41 can determine that the floating installation vessel 3 is experiencing heave motion with an amplitude of ±0.5 m at a frequency of 0.2 Hz, roll motion RX of ±8° at a frequency of 0.1 Hz, and pitch motion RY of ±4° at a frequency of 0.3 Hz, and insignificant yaw motion RZ. From the computed roll and pitch motions RX, RY, a corrective signal computation module 42 computes a corrective control signal C_12A for a tagline winch 12A, a corrective control signal C_13A for a guidewire winch 13A, and a corrective control signal C_10 for a crane motor to adjust the angle of the crane boom.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An offshore wind turbine installation arrangement, comprising:
   a lifting assembly configured to hoist a suspended load between a floating installation vessel and a wind turbine assembly, the lifting assembly comprising a crane supported by the floating installation vessel;
   a sensor arrangement configured to sense at least a motion of the floating installation vessel, the sensor arrangement comprising a plurality of markers mounted to the floating installation vessel and at least one camera mounted at a base of the wind turbine assembly, wherein the plurality of markers are an LED that emits light detected by the at least one camera; and
   a controller configured to generate a plurality of control signals to control elements of the lifting assembly on a basis of the motion to adjust a position of the suspended load relative to the wind turbine assembly.

2. The installation arrangement according to claim 1, wherein the sensor arrangement is configured to sense a rotatory motion of the floating installation vessel and/or a heave motion of the floating installation vessel.

3. The installation arrangement according to claim 1, wherein the sensor arrangement is configured to sense a lateral displacement of the wind turbine assembly.

4. The installation arrangement according to claim 1, wherein the lifting assembly comprises a lifting tool with a suspension interface for suspending the lifting tool from a crane hook, the suspension interface comprising a number of vertically extendable actuators, and wherein the controller is configured to control a vertically extendable actuator at least on a basis of a sensed heave motion of the floating installation vessel.

5. The installation arrangement according to claim 1, wherein the lifting assembly comprises a lifting tool with a gripping assembly for gripping the suspended load, and a tagline arrangement for stabilizing the suspended load relative to the crane, and wherein the controller is configured to control at least a winch motor of the tagline arrangement on a basis of a sensed rotatory motion of the floating installation vessel.

6. The installation arrangement according to claim 5, wherein the sensor arrangement comprises a number of sensors arranged to sense a displacement of the suspended load, and wherein the gripping assembly comprises a number of laterally extendable actuators, and wherein the controller is configured to control a laterally extendable actuator on a basis of the sensed displacement of the suspended load.

7. The installation arrangement according to claim 6, wherein an actuator of the lifting tool comprises a hydraulic cylinder.

8. The installation arrangement according to claim 1, wherein the controller is configured to compute a suitable displacement of an actuator of the lifting assembly to counteract a sensed motion.

9. The installation arrangement according to claim 8, wherein the controller is configured to generate a control signal for the actuator on a basis of the sensed motion.

10. The installation arrangement according to claim 1, wherein the sensor arrangement comprises a plurality of accelerometers arranged on the floating installation vessel.

11. The installation arrangement according to claim 1, wherein the sensor arrangement comprises a plurality of accelerometers arranged on the suspended load and/or on a lifting tool holding the suspended load.

12. The installation arrangement according to claim 1, wherein the installation arrangement is configured for an installation of the wind turbine assembly with a tower height of at least 100 m and/or wherein the installation arrangement is configured for the installation of the wind turbine assembly at a water depth of at least 40 m.

13. A method of hoisting a load between a floating installation vessel and an offshore wind turbine assembly, the method comprising:
   providing a lifting assembly, comprising a crane supported by a floating installation vessel to hoist the load;
   sensing a motion of the floating installation vessel during a lifting manoeuvre using a sensor arrangement comprising a plurality of markers mounted to the floating installation vessel and at least one camera mounted at a base of the wind turbine assembly, wherein the plurality of markers are an LED that emits light detected by the at least one camera; and
   generating a plurality of control signals to control elements of the lifting assembly at least on a basis of the motion to adjust a position of the load relative to the offshore wind turbine assembly.

14. A computer program product, comprising a computer readable hardware storage device having computer readable program code stored therein, said program code executable by a processor of a computer system to implement a method according to claim 13 when the computer program is executed by the controller of the installation arrangement.

\* \* \* \* \*